US010115958B2

(12) United States Patent
Tsutsumi et al.

(10) Patent No.: US 10,115,958 B2
(45) Date of Patent: Oct. 30, 2018

(54) MANUFACTURING METHOD OF ELECTRIC STORAGE DEVICE AND ELECTRIC STORAGE DEVICE

(75) Inventors: Masakazu Tsutsumi, Kyoto (JP); Motoki Hoshino, Kyoto (JP); Jun Nakamura, Kyoto (JP); Shinsuke Yoshitake, Kyoto (JP); Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 1364 days.

(21) Appl. No.: 13/816,698

(22) PCT Filed: Aug. 3, 2011

(86) PCT No.: PCT/JP2011/067767
§ 371 (c)(1),
(2), (4) Date: Feb. 12, 2013

(87) PCT Pub. No.: WO2012/023434
PCT Pub. Date: Feb. 23, 2012

(65) Prior Publication Data
US 2013/0143111 A1    Jun. 6, 2013

(30) Foreign Application Priority Data
Aug. 17, 2010    (JP) .................. 2010-182132

(51) Int. Cl.
H01M 2/36    (2006.01)
H01M 2/26    (2006.01)
H01M 2/30    (2006.01)

(52) U.S. Cl.
CPC .............. H01M 2/36 (2013.01); H01M 2/26 (2013.01); H01M 2/263 (2013.01); H01M 2/30 (2013.01);
(Continued)

(58) Field of Classification Search
CPC ........ H01M 2/36; H01M 2/361; H01M 2/365; H01M 2/30; H01M 2/26; H01M 2/263
See application file for complete search history.

(56) References Cited

U.S. PATENT DOCUMENTS

2004/0191612 A1    9/2004 Akita et al.
2006/0024568 A1*   2/2006 Lee .................... H01M 2/14
                                                          429/130
(Continued)

FOREIGN PATENT DOCUMENTS

EP    2299523 A1    7/2009
JP    08-250102 A   9/1996
(Continued)

OTHER PUBLICATIONS

English translation of JP 2005216825: JP_2005216825_translate.pdf (Aug. 2005).*
(Continued)

Primary Examiner — Milton I Cano
Assistant Examiner — Jennifer A Moss
(74) Attorney, Agent, or Firm — McGinn I.P. Law Group, PLLC.

(57) ABSTRACT

A manufacturing method of an electric storage device includes: a current collector assembly step of disposing a current collector between an electrolyte solution pouring opening and a power generating element so as to block a view of the power generating element from the electrolyte solution pouring opening; an electrolyte solution pouring step of pouring an electrolyte solution through the electrolyte solution pouring opening; and a sealing step of disposing a sealing member at the electrolyte solution pouring opening and sealing the electrolyte solution pouring opening by welding.

16 Claims, 9 Drawing Sheets

(52) U.S. Cl.
CPC .......... *H01M 2/361* (2013.01); *H01M 2/365* (2013.01); *Y10T 29/4911* (2015.01); *Y10T 29/49108* (2015.01)

(56) References Cited

U.S. PATENT DOCUMENTS

| | | |
|---|---|---|
| 2006/0073382 A1 | 4/2006 | Urano et al. |
| 2011/0052949 A1* | 3/2011 | Byun .................. H01M 2/043 429/61 |
| 2011/0159356 A1 | 6/2011 | Tozuka et al. |

FOREIGN PATENT DOCUMENTS

| | | | | |
|---|---|---|---|---|
| JP | 2000-021437 A | 1/2000 | | |
| JP | 2004-303500 A | 10/2004 | | |
| JP | 2005-142026 A | 6/2005 | | |
| JP | 2005-158649 A | 6/2005 | | |
| JP | 2005-216825 A | 8/2005 | | |
| JP | 2005216825 A * | 8/2005 | ............ | H01M 10/04 |
| JP | 2005-267945 A | 9/2005 | | |
| JP | 2006-100097 A | 4/2006 | | |
| JP | 2008-127656 A | 6/2008 | | |
| JP | 2009-087727 A | 4/2009 | | |
| JP | 2009-087728 A | 4/2009 | | |
| JP | 2009-277604 A | 11/2009 | | |
| JP | 2010-015867 A | 1/2010 | | |
| JP | 2010-097764 A | 4/2010 | | |
| WO | WO 2010/001975 A1 | 1/2010 | | |

OTHER PUBLICATIONS

International Search Report in PCT/JP2011/0667767 dated Nov. 15, 2011(English Translation Thereof).

* cited by examiner

[Fig. 1]
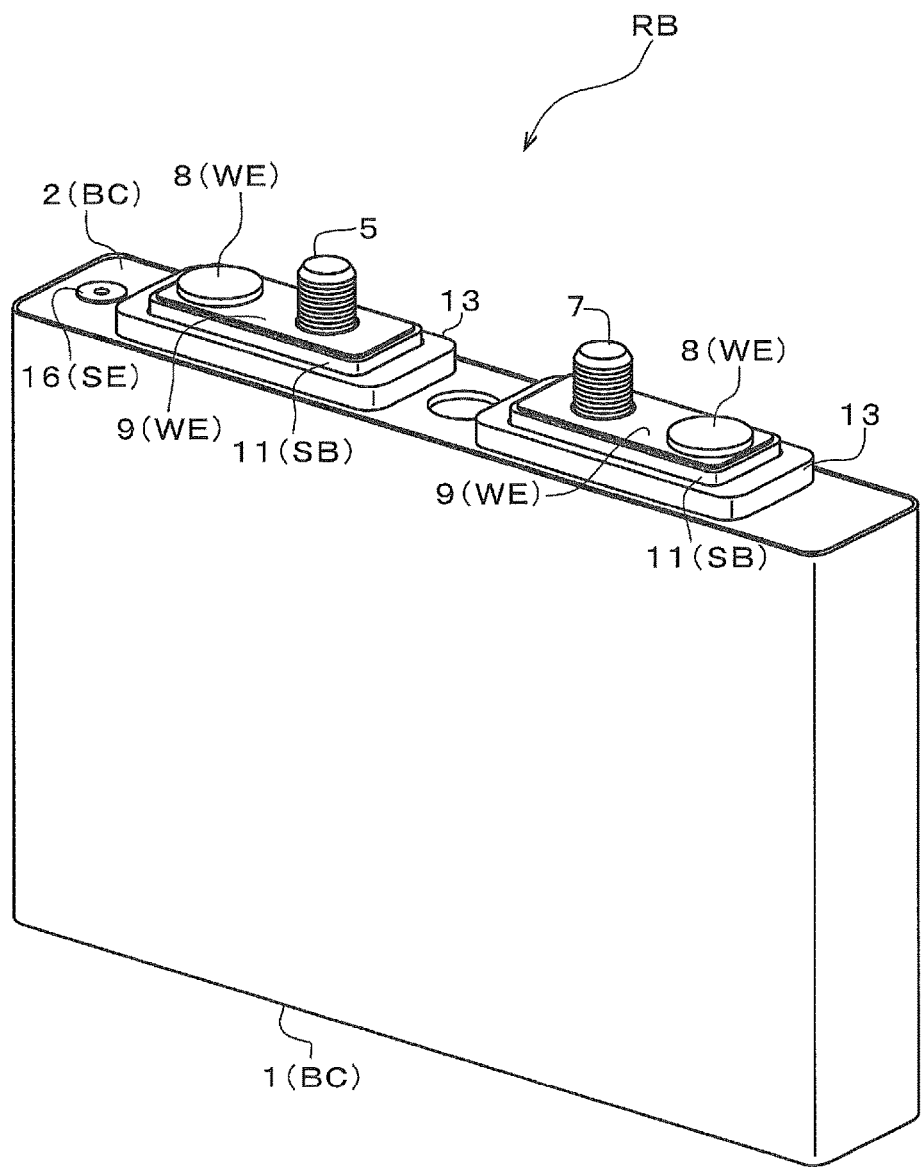

[Fig. 2]
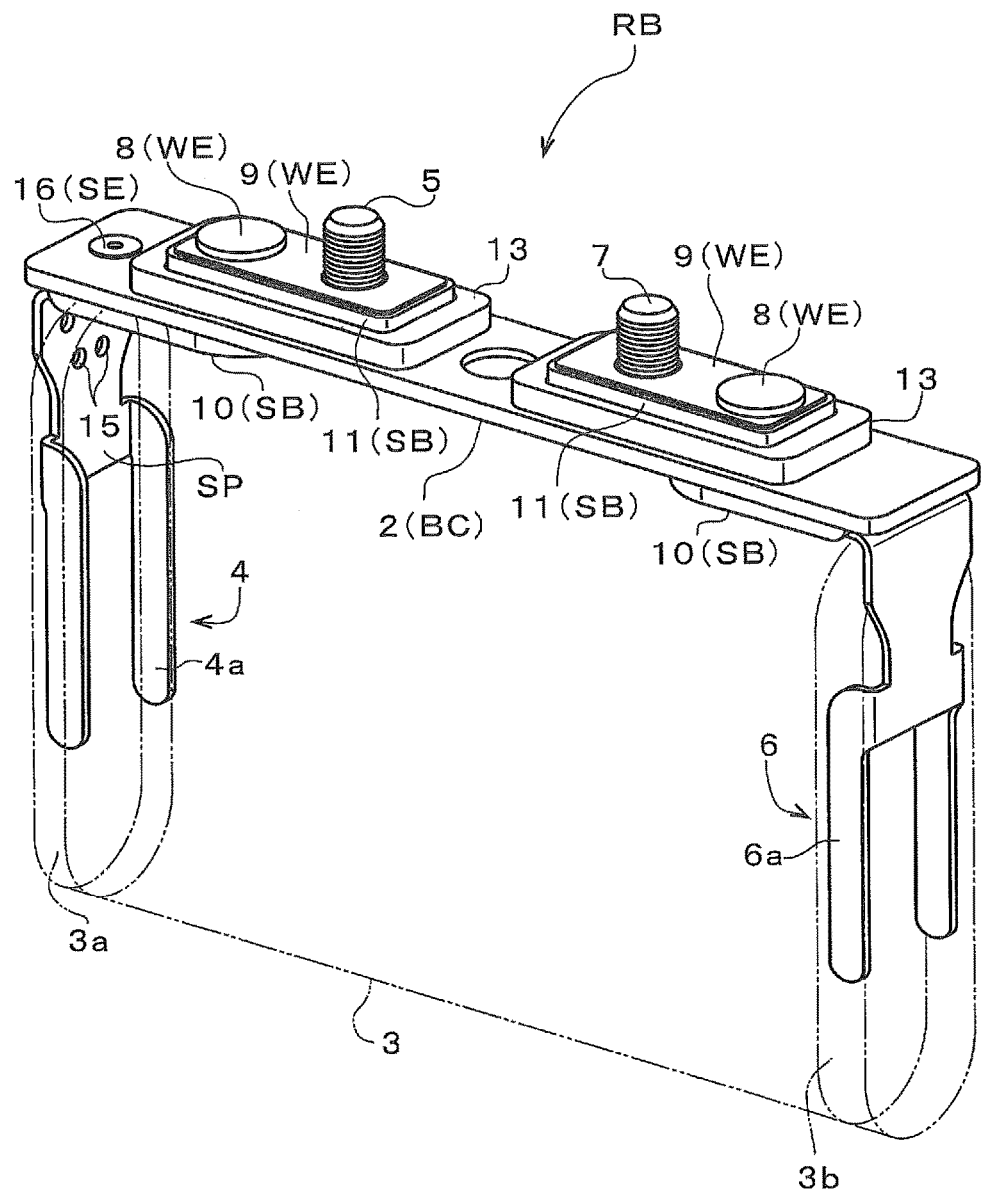

[Fig. 3]
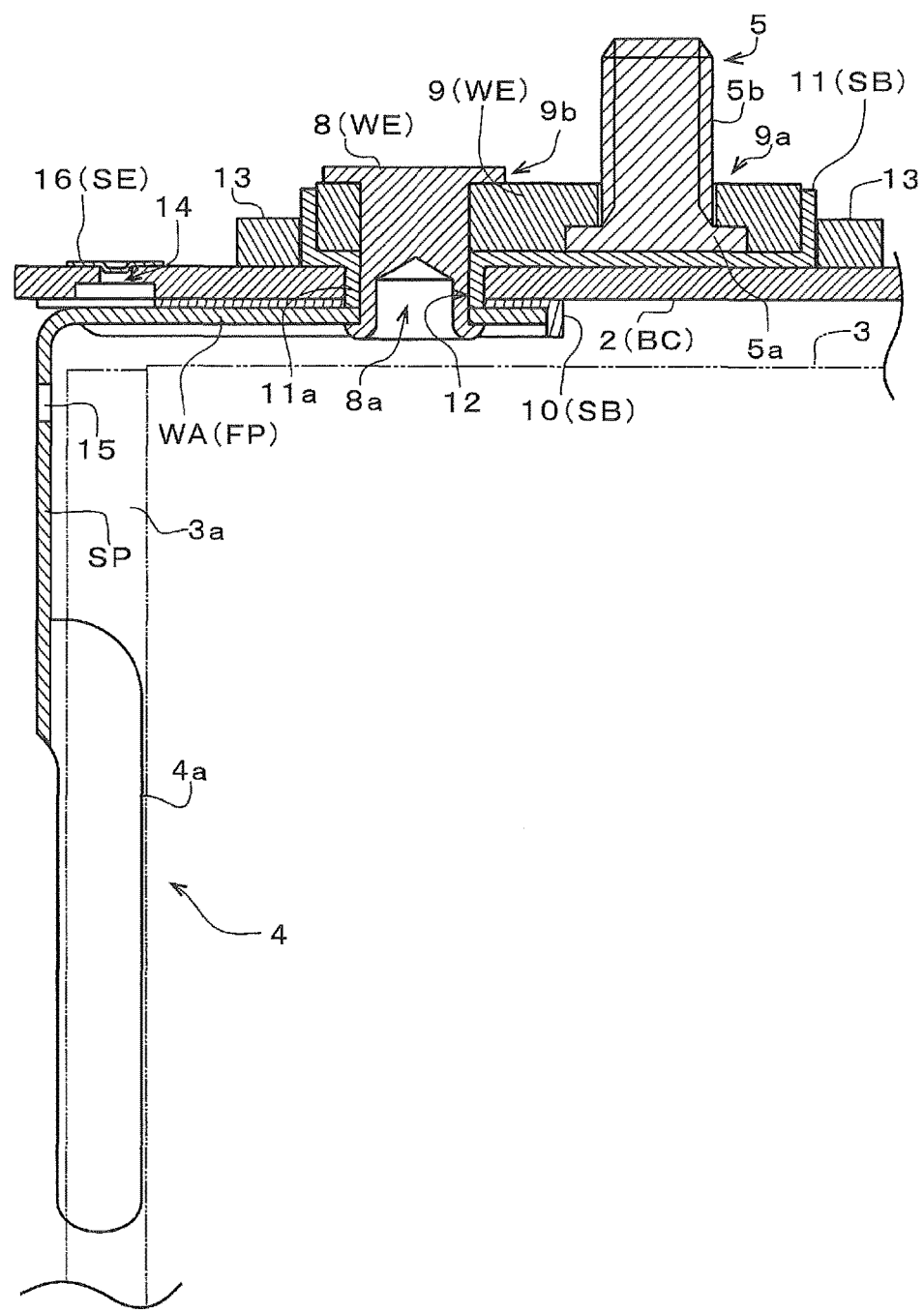

[Fig. 4]
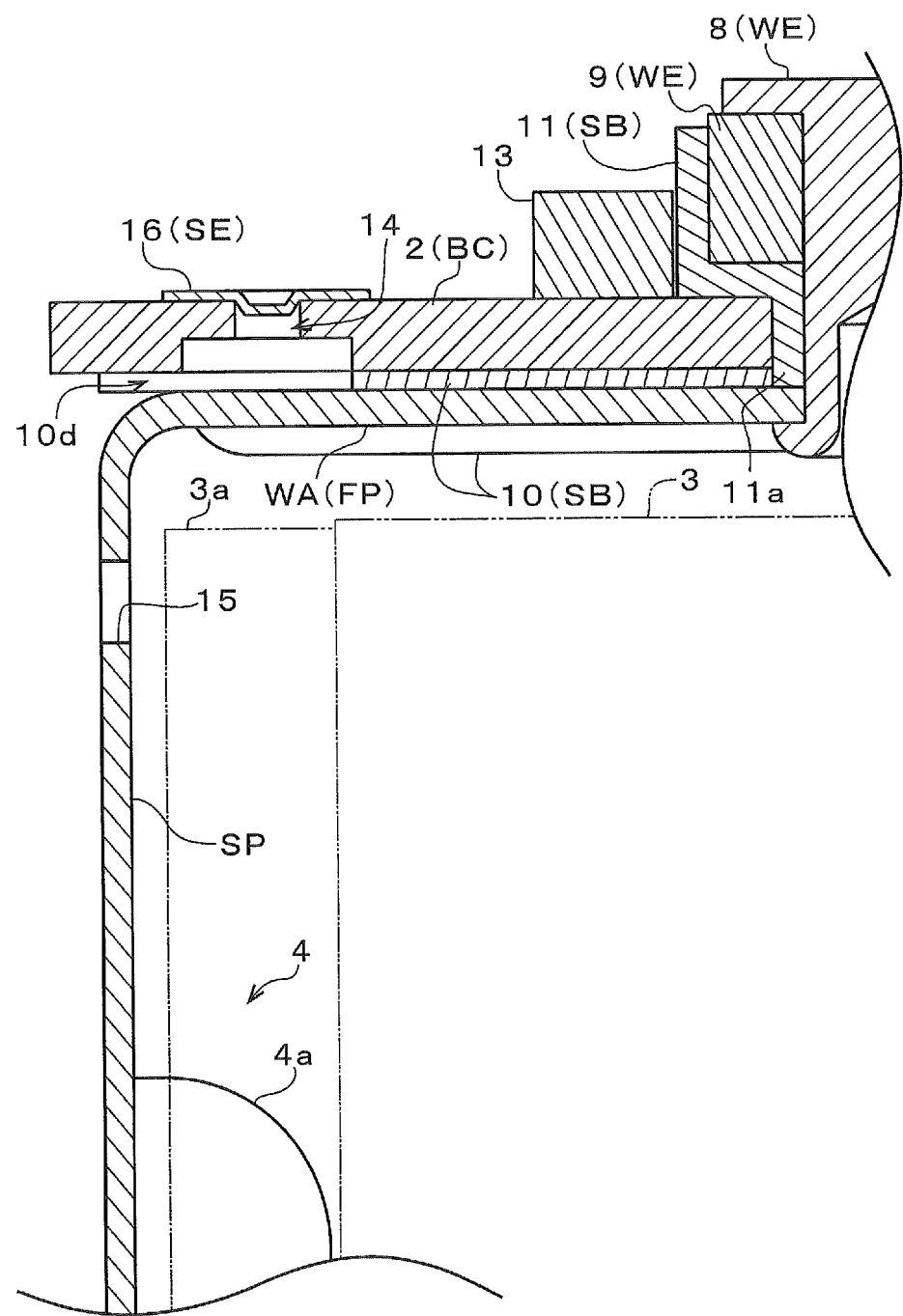

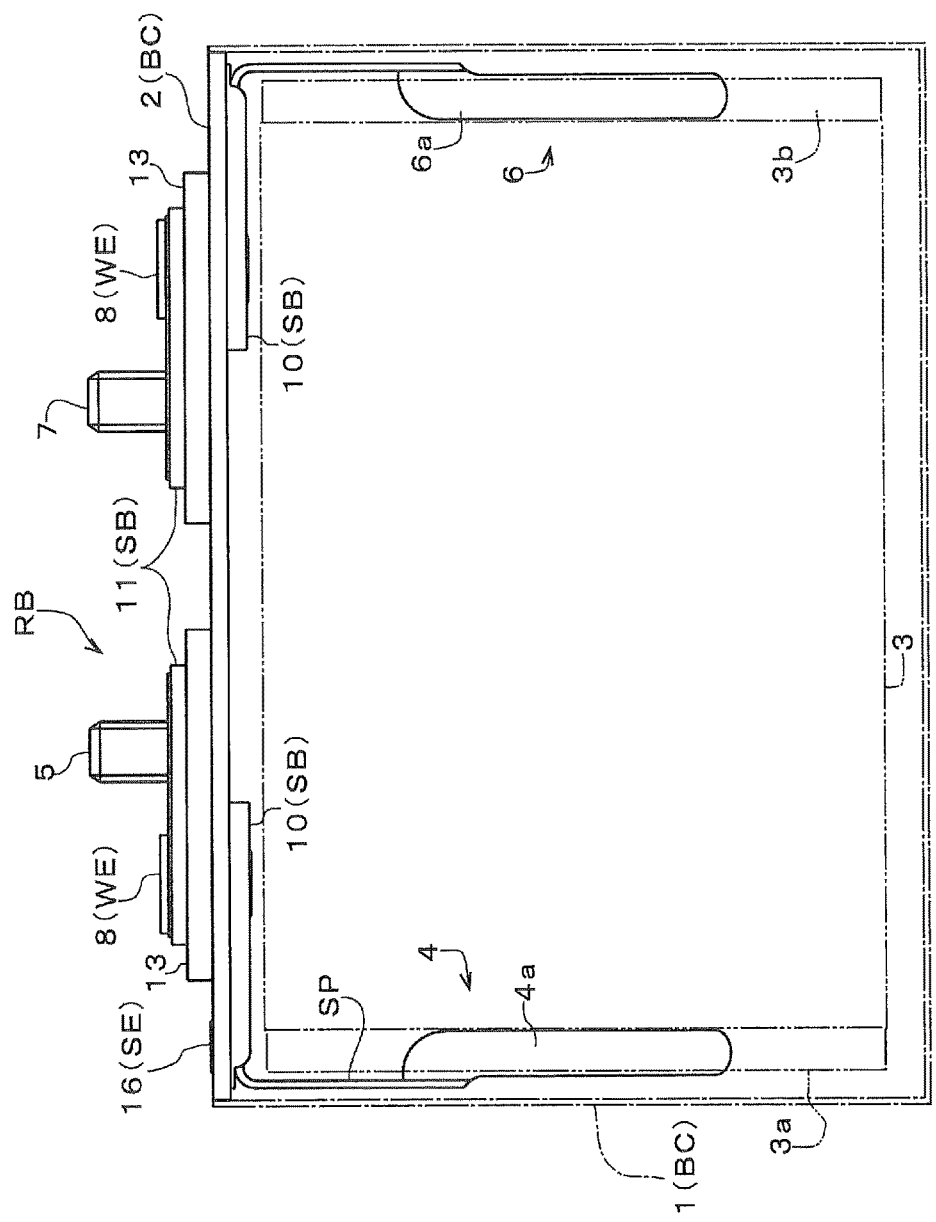
[Fig. 5]

[Fig. 6]
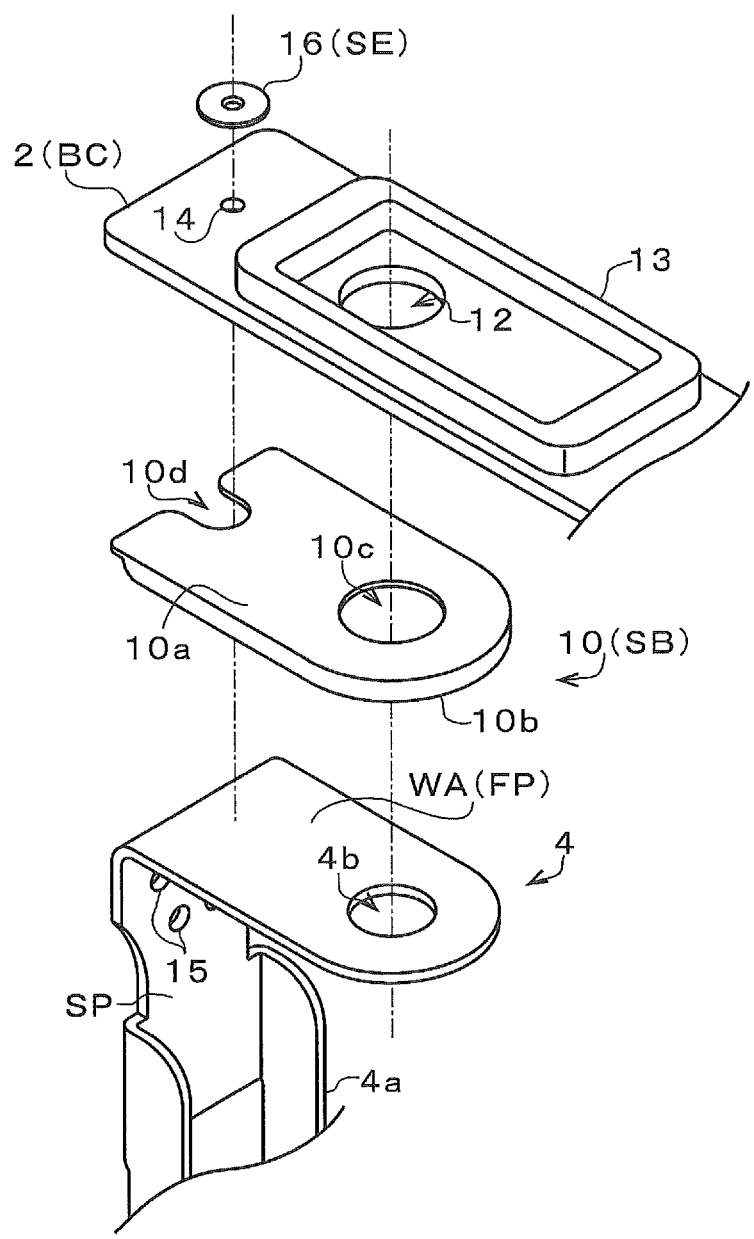

[Fig. 7]
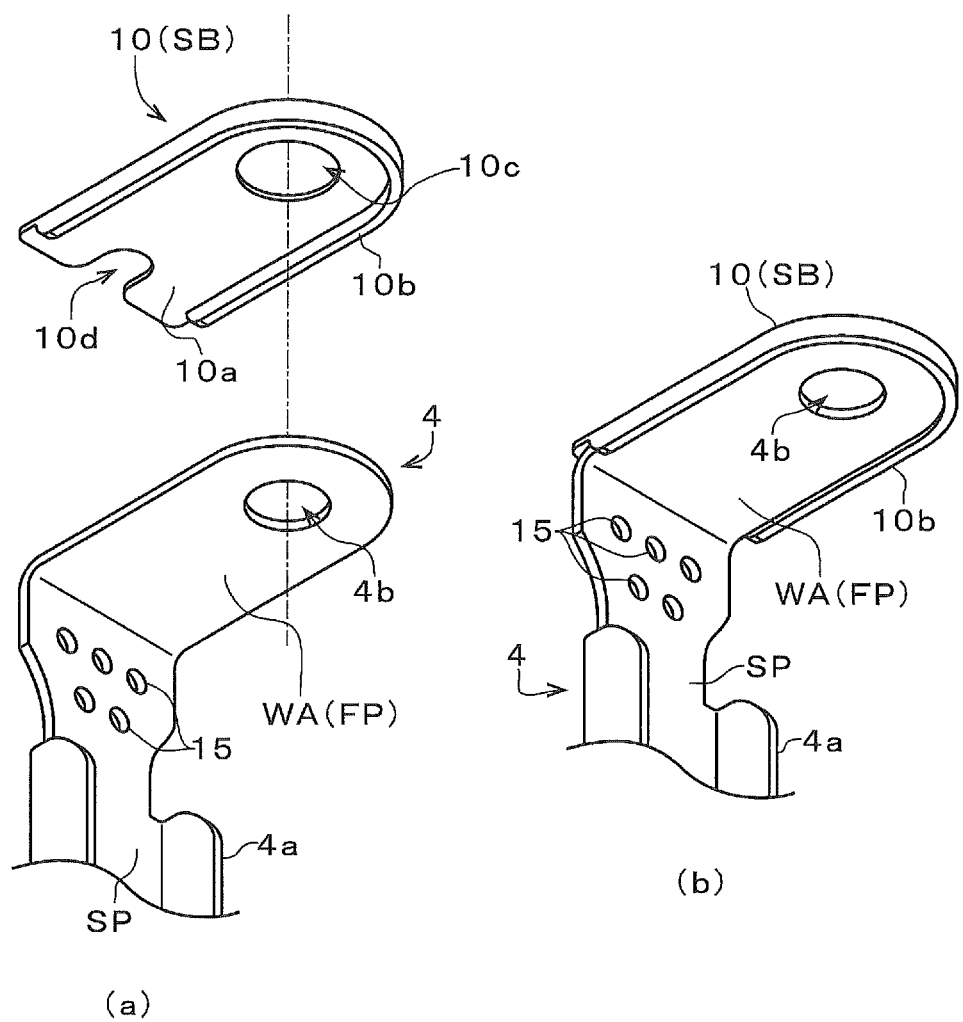

[Fig. 8]
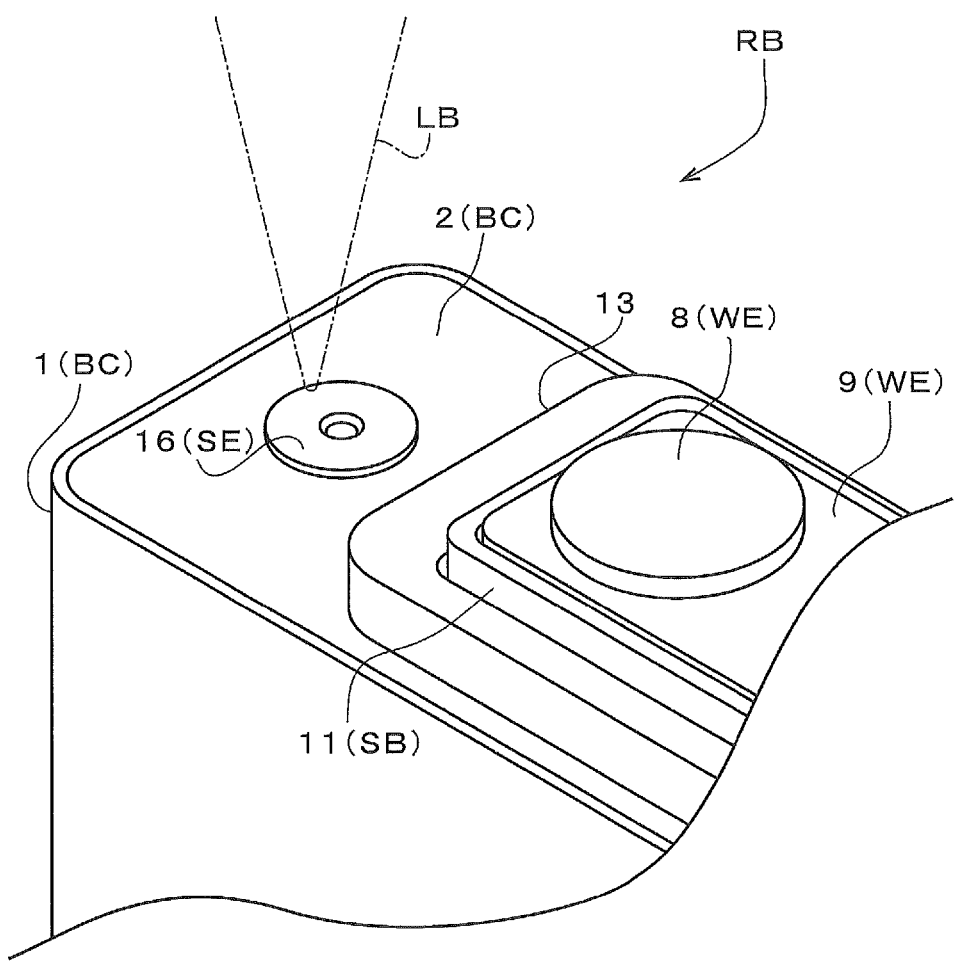

[Fig. 9]
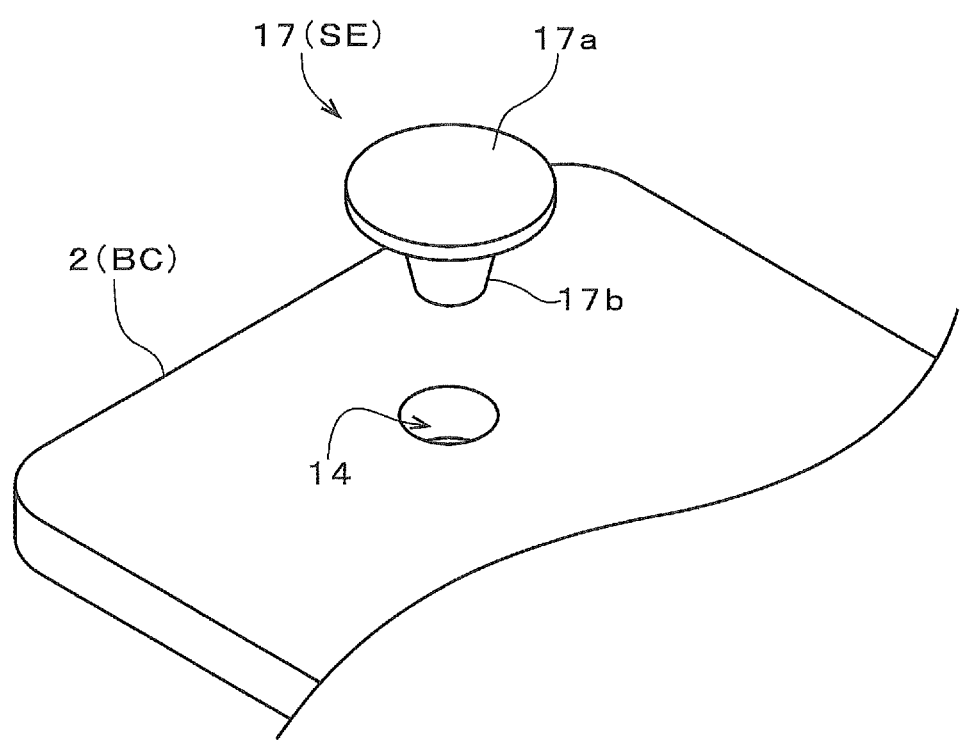

MANUFACTURING METHOD OF ELECTRIC STORAGE DEVICE AND ELECTRIC STORAGE DEVICE

TECHNICAL FIELD

The present invention relates to a manufacturing method of an electric storage device and an electric storage device, and particularly to a manufacturing method of an electric storage device and the electric storage device including a case having an electrolyte solution pouring opening through which an electrolyte solution is poured into the case, an electric storage element housed in the case, an electrode terminal disposed on an outer side of the case, and a current collector for electrically connecting the electric storage element and the electrode terminal.

BACKGROUND ART

A battery, which is an example of an electric storage device, requires pouring of an electrolyte solution into a case of the battery in a manufacturing process of the battery. For this purpose, an electrolyte solution pouring opening is formed at the case of the battery in many cases and the electrolyte solution is poured through the electrolyte solution pouring opening.

In this case, the electrolyte solution is poured into the case through the electrolyte solution pouring opening and the electrolyte solution pouring opening needs to be sealed after a predetermined step. As widely used methods of sealing, the electrolyte solution pouring opening is sealed by screwing an electrolyte solution plug thereinto, or the electrolyte solution pouring opening is sealed by being covered with a lid-shaped member and welding the member as described in Patent Document 1 listed below.

PRIOR ART DOCUMENT

Patent Document

Patent Document 1: JP-A-2008-127656

SUMMARY OF THE INVENTION

Problems to be Solved by the Invention

However, when the method of sealing the electrolyte solution pouring opening by welding is employed, for example, if the welding is carried out while the electrolyte solution pouring opening and the lid-shaped member for sealing are displaced from each other, spatters generated during the welding may drop into the case of the battery through a small gap formed by the displacement. Moreover, if the welding is laser welding, a laser beam may enter the case through the small gap formed by the displacement.

Normally, a power generating element which is an electric storage element is disposed at a portion in the case of the battery and below the electrolyte solution pouring opening, and therefore, when the spatters drop during the welding or the laser beam for the welding directly enters as described above, it is highly likely that the power generating element, especially, a separator positioned on an outermost side of the power generating element, is damaged.

Moreover, in a manufacturing process of the battery, a step of pouring an electrolyte solution into the case takes time, and therefore quick pouring of the electrolyte solution has been desired. To solve this problem, a size of an electrolyte solution pouring opening may be increased to the maximum.

If the size of the electrolyte solution pouring opening is increased, a size of the electrolyte solution pouring plug needs to be increased as well. Considering dimensions of a face of the case in which the electrolyte solution pouring opening is formed, there is a limit to increase in the size of the electrolyte solution pouring opening. It is difficult to increase the size of the electrolyte solution pouring opening to such an extent that the laser beam or the spatters do not enter the case.

Furthermore, when a charging step called preliminary charge is carried out before the sealing of the electrolyte solution pouring opening after the battery is assembled, the electrolyte solution pouring plug placed on the electrolyte solution pouring opening may be displaced by the action of pressure of gas generated in the preliminary charge.

Such a problem relates not only to batteries but to electric storage devices in general such as a capacitor having a similar structure.

The present invention has been made in view of such circumstances, and an object thereof is to prevent, as much as possible, damage to an electric storage element due to a trouble occurring during welding when an electrolyte solution pouring opening formed at a case of the electric storage device is sealed by welding.

Means for Solving the Problems

To achieve the above object, a manufacturing method of an electric storage device includes: a current collector assembly step of disposing a current collector between an electrolyte solution pouring opening and an electric storage element so as to block a view of the electric storage element from the electrolyte solution pouring opening; an electrolyte solution pouring step of pouring an electrolyte solution through the electrolyte solution pouring opening into a case; and a sealing step of disposing a sealing member at the electrolyte solution pouring opening and sealing the electrolyte solution pouring opening by welding, for the electric storage device including the case having the electrolyte solution pouring opening through which the electrolyte solution is to be poured into the case, the electric storage element housed in the case, an electrode terminal disposed on an outer side of the case, and the current collector for electrically connecting the electric storage element and the electrode terminal.

In the manufacturing method of the electric storage device according to the present invention, in addition to the above-described features, preferably, a wide portion having a larger width than an opening width of the electrolyte solution pouring opening is formed at the current collector, and the wide portion is disposed between the electrolyte solution pouring opening and the electric storage element in the current collector assembly step.

An electric storage device according to the present invention includes: a case having an electrolyte solution pouring opening through which an electrolyte solution is to be poured into the case; an electric storage element housed in the case; an electrode terminal disposed on an outer side of the case; and a current collector having at least a first attitude portion disposed in an attitude along a face, in which the electrolyte solution pouring opening is formed, to block a view of the electric storage element from the electrolyte solution pouring opening, the current collector electrically connecting the electric storage element and the electrode terminal.

In addition to the above-described features, preferably, the case is substantially formed into a flat rectangular parallelepiped shape, the electrolyte solution pouring opening is formed in a face of the case mounted with the electrode terminal, the current collector includes the first attitude portion and a second attitude portion that is in an attitude along a side face of the case substantially orthogonal to the face in which the electrolyte solution pouring opening is formed, the first attitude portion and the second attitude portion being formed by a plate-shaped member bent into a substantially L shape.

Yet preferably, a through hole is formed in a position displaced from a position of the current collector facing the electrolyte solution pouring opening.

Furthermore, preferably, the electric storage device further includes an insulating sealing member disposed between the case and the current collector, when the current collector and a wiring member passing through the case are mounted with the case interposed therebetween, wherein the sealing member has an extending portion for entering a gap formed between the current collector and a side face of the case substantially orthogonal to the face in which the electrolyte solution pouring opening is formed.

Advantages of the Invention

According to the present invention, when the electrolyte solution pouring opening, provided to the case of the electric storage device, is sealed by welding, it is possible to prevent, as much as possible, damage to the electric storage element and the like due to a trouble occurring in the welding.

BRIEF DESCRIPTION OF THE DRAWINGS

FIG. 1 is an external perspective view of an electric storage device according to an embodiment of the present invention.

FIG. 2 is a perspective view of an inside of the electric storage device according to the embodiment of the present invention.

FIG. 3 is a sectional view of an essential portion according to the embodiment of the present invention.

FIG. 4 is an enlarged sectional view of the essential portion according to the embodiment of the present invention.

FIG. 5 is a front view showing the inside of the electric storage device according to the embodiment of the present invention.

FIG. 6 is a view for explaining an assembled state of parts according to the embodiment of the present invention.

FIGS. 7(a) and 7(b) are views for explaining the assembled state of the parts according to the embodiment of the present invention.

FIG. 8 is a view for explaining a manufacturing process of the electric storage device according to the embodiment of the present invention.

FIG. 9 is a view showing a shape of an electrolyte solution plug according to another embodiment of the present invention.

MODES FOR CARRYING OUT THE INVENTION

An embodiment of an electric storage device and a manufacturing method of the electric storage device according to the present invention will be described below based on the drawings.

Although a nonaqueous electrolyte secondary battery and more specifically a lithium-ion battery will be described as an example of an electric storage device in the present embodiment, the present invention can be applied not only to batteries such as a lithium-ion battery but to electric storage devices in general including a capacitor and the like.

[Structure of Nonaqueous Electrolyte Secondary Battery RB]

As shown in perspective views in FIGS. 1 and 2 and a front view in FIG. 5, the nonaqueous electrolyte secondary battery RB has a case BC formed by placing and welding a lid portion 2 onto an open face of a can body 1 in a cylindrical shape with a bottom (more specifically, a rectangular cylindrical shape with a bottom).

The lid portion 2 is formed by a strip-shaped rectangular plate member, and a terminal bolt 5 which is a positive electrode terminal and a terminal bolt 7 which is a negative electrode terminal are mounted to a face of the lid portion 2 on an outer side of the case BC.

The can body 1 is a flat rectangular parallelepiped adapted to a shape of the lid portion 2, and therefore the entire case BC is substantially in a shape of a flat rectangular parallelepiped. FIG. 2 shows an inner structure of the case BC by removing the can body 1 from the completed secondary battery RB shown in FIG. 1. In FIG. 5, the can body 1 is shown by one-dot chain lines and a power generating element 3 (described later) is shown by two-dot chain lines to facilitate understanding of the inner structure. The power generating element refers to the electric storage element which includes a positive electrode plate and a negative electrode plate and can store electric power.

As shown by the two-dot chain lines in FIGS. 2 and 5, in the case BC, the power generating element 3 and current collectors 4 and 6 are housed while immersed in an electrolyte solution. The current collectors 4 and 6 are members for electrically connecting the power generating element 3 and the terminal bolts 5 and 7.

Both of the current collector 4 and the current collector 6 are conductive bodies. The current collector 4 on a positive electrode side is made of aluminum and the current collector 6 on a negative electrode side is made of copper. The current collectors having the same shapes are arranged symmetrically.

Each of the current collectors 4 and 6 is formed by bending a plate-shaped member made of the above-described metal material into a predetermined shape, and has a substantially L-shaped bent shape including a first attitude portion FP (see FIG. 3) extending along the lid portion 2, which is a face mounted with the terminal bolts 5 and 7, to be connected to the terminal bolt 5 or 7, and a second attitude portion SP (see FIG. 3) bending down at 90° near an end portion in a longitudinal direction of the lid portion 2 and extending in a direction of a normal to a face of the lid portion 2 on an inner side of the case BC, to be connected to the power generating element 3, the portions formed next to each other.

The second attitude portion SP is further bent toward the power generating element 3 to form connection portions 4a or 6a to be connected to the power generating element 3. Furthermore, as shown in FIG. 6, a rivet mounting hole 4b through which a hollow rivet 8 is to be inserted is formed at an upper end of the current collector 4. Although not illustrated, a similar rivet mounting hole is also formed in the current collector 6.

The power generating element 3 is formed as a so-called winding-type power generating element formed by respectively applying active materials on a pair of electrode plates including a positive electrode plate formed in a long foil shape and a negative electrode plate formed in a long foil shape, and winding the electrode plates in a layered state with similarly long separators sandwiched therebetween.

In the above-described wound state of the power generating element 3, a portion 3a of the foil-shaped positive electrode plate not applied with the active material extends out from a side (in a direction orthogonal to a longitudinal direction of the foil-shaped positive electrode plate), and a portion 3b of the foil-shaped negative electrode plate not applied with the active material extends out from an opposite side (in a direction orthogonal to a longitudinal direction of the foil-shaped negative electrode plate). The power generating element 3 is formed by winding the foil-shaped positive electrode plate and the like, and then flattening them in a direction orthogonal to a winding axis into a flat shape to adapt to the flat case BC.

The power generating element 3 is disposed in the can body 1 in such an attitude that the winding axis of the foil-shaped positive electrode plate and the like is parallel to the longitudinal direction of the lid portion 2. As shown in FIG. 5, in a front view, the not-applied portion 3a of the foil-shaped positive electrode plate is positioned to overlap the connection portion 4a of the current collector 4 and the not-applied portion 3b of the foil-shaped negative electrode plate is positioned to overlap the connection portion 6a of the current collector 6.

The not-applied portion 3a of the foil-shaped positive electrode plate is welded to the current collector 4 in a bundled state, and the not-applied portion 3b of the foil-shaped negative electrode plate is welded to the current collector 6 in a bundled state.

The terminal bolt 5 on the positive electrode side and mounted to the lid portion 2 made of metal (specifically, aluminum) is electrically connected to the current collector 4 on the positive electrode side and the terminal bolt 7 on the negative electrode side is electrically connected to the current collector 6 on the negative electrode side.

A structure for mounting the terminal bolt 5 to the lid portion 2 and a structure for connecting the terminal bolt 5 and the current collector 4 are substantially the same as a structure for mounting the terminal bolt 7 to the lid portion 2 and a structure for connecting the terminal bolt 7 and the current collector 6, and the structures are arranged symmetrically. The structures on the positive electrode side will be described below as representatives.

As shown in a sectional view in FIG. 3, the terminal bolt 5 is electrically connected to the current collector 4 by a hollow rivet 8 and a bus bar 9. The hollow rivet 8 and the bus bar 9 which are wiring members WE are made of metal material, and more specifically, aluminum on the positive electrode side similarly to the other metal members on the positive electrode side.

The bus bar 9 has a function of retaining a head portion 5a of the terminal bolt 5 to stabilize an attitude of the terminal bolt 5 and prevent turning, and includes a terminal retaining portion 9a, formed by a rectangular recessed portion adapted to a head shape (rectangular shape) of the terminal bolt 5 and a through hole through which a thread portion 5b of the terminal bolt 5 is to be passed, and a rivet retaining portion 9b for retaining the hollow rivet 8.

The current collector 4 is positioned in the case BC, the terminal bolt 5 and the bus bar 9 are disposed on the outer side of the case, and the hollow rivet 8 passes through an opening 12 in the lid portion 2 to connect the inside of the case and the outside of the case.

A current path from the current collector 4 to the terminal bolt 5 is electrically insulated from the lid portion 2 by lower packing 10 and upper packing 11 which are sealing members SB made of insulating material, and a portion of the lid portion 2 through which the hollow rivet 8 passes is airtightly sealed with the lower packing 10 and the upper packing 11.

The upper packing 11 has a structure formed by attaching a cylindrical portion 11a, which is fitted into the opening 12 in the lid portion 2, to a bottom portion of an open-topped dish-shaped container in a shape of a rectangular parallelepiped, and is attached into a support frame 13 mounted to an outer surface of the lid portion 2. The hollow rivet 8 is fitted into an inner space of the cylindrical portion 11a. In a state in which the terminal bolt 5 and the like are mounted to the lid portion 2, the bottom portion of the upper packing 11 is pinched between the bus bar 9 and the lid portion 2.

In a state in which the current collector 4 and the like are mounted to the lid portion 2, the lower packing 10 is pinched between the current collector 4 and the lid portion 2. As shown in FIG. 6 which is a perspective view for explaining assembly of the lower packing 10 and the current collector 4 and FIGS. 7(a) and 7(b) which are perspective views seen from a lower side, the lower packing 10 includes a thin-plate-shaped base portion 10a having substantially the same shape as an upper end (first attitude portion FP) of the current collector 4 extending along the lid portion 2 when seen in a direction of a normal, and a low vertical wall portion 10b rising at right angle with the base portion 10a from an end edge of the base portion 10a.

In the base portion 10a of the lower packing 10, there are formed an opening 10c through which a lower end of the upper packing 11 and the hollow rivet 8 pass, and a notch portion 10d to be positioned directly below an electrolyte solution pouring opening 14 (described later) when the lower packing 10 is attached to the lid portion 2.

The structure for electrically connecting the terminal bolt 7 and the current collector 6 on the negative electrode side is the structure which is substantially the same as the structure for connecting the terminal bolt 5 and the current collector 4 on the positive electrode side and which is disposed symmetrically as described above. However, the hollow rivet 8 and the bus bar 9 which are conductive bodies (more specifically, metal) forming the current path are made of copper which is the same as material of the current collector 6 on the negative electrode side.

Shapes of the structures on the positive electrode side and the negative electrode side are different from each other in that a plurality of through holes 15 are formed in a position, near the bent portion, of the portion of the substantially L-shaped current collector 4 (on the positive electrode side) and extending in a direction (vertical direction in FIG. 3) orthogonal to the face of the lid portion 2 mounted with the terminal bolt 5 and the like, while such through holes are not formed in the current collector 6 on the negative electrode side. As will be described specifically below, the through holes 15 are for allowing the electrolyte solution poured into the case BC to smoothly flow to a position where the power generating element 3 exists.

In the lid portion 2 of the case BC which is the face mounted with the terminal bolts 5 and 7 (electrode terminals) and the like, the electrolyte solution pouring opening 14 through which the electrolyte solution is to be poured into the case BC is further formed.

As shown in FIG. 4 showing an enlarged view of an area around the electrolyte solution pouring opening 14 in the sectional view in FIG. 3, the electrolyte solution pouring opening 14 is formed by a stepped through hole including a lower portion having a larger diameter, and is sealed on an outer side of the case BC with an electrolyte solution plug 16 substantially in a shape of a flat plate with a depressed central portion.

As shown in FIG. 4, the depressed portion of the electrolyte solution plug 16 has an outer shape adapted to a small-diameter portion of the electrolyte solution pouring opening 14 and has a function of positioning when the electrolyte solution plug 16 is fixed.

The electrolyte solution pouring opening 14 is formed in a central position in a width direction of the lid portion 2, and between an end edge of the lid portion 2 and the support frame 13 in the longitudinal direction of the lid portion 2.

In other words, a position where the electrolyte solution pouring opening 14 is disposed is closer to the end edge of the lid portion 2, which is the closest to the current collector 4, than a position where the current collector 4 is fixed to the lid portion 2 (the position where the current collector 4 is fixed by the hollow rivet 8). The electrolyte solution pouring opening 14 is not necessarily formed in the central position in the width direction of the lid portion 2, but may be formed in a position closer to one of end portions.

As described above, the current collector 4 has the substantially L-shaped bent shape, and includes the portion in the attitude along the face in which the electrolyte solution pouring opening 14 is formed (i.e., the face of the substantially plate-shaped lid portion 2 on the inner side of the case BC), and the portion in the attitude along the side face of the case BC substantially orthogonal to the face in which the electrolyte solution pouring opening 14 is formed (i.e., the vertical wall face of the can body 1) when the current collector 4 is mounted to the case BC.

As described already, the portion in the attitude along the face in which the electrolyte solution pouring opening 14 is formed is referred to as the first attitude portion FP, and the portion in the attitude along the side face of the case BC substantially orthogonal to the face in which the electrolyte solution pouring opening 14 is formed is referred to as the second attitude portion SP. Because the current collector 4 is disposed in this attitude, the first attitude portion FP of the current collector 4 exists directly below the electrolyte solution pouring opening 14.

The first attitude portion FP, i.e., the upper end portion of the current collector 4 has a slightly smaller width than a width of an inner side face of the can body 1 in the width direction of the lid portion 2 (a thickness direction of the flat case BC), and as compared with the electrolyte solution pouring opening 14, the first attitude portion FP is formed as a wide portion WA having a larger width than an opening width of the electrolyte solution pouring opening 14 (an inner diameter of the electrolyte solution pouring opening 14 in the face of the lid portion 2 on the outer side of the case BC).

By disposing the wide portion WA close to the electrolyte solution pouring opening 14 in the lid portion 2 with the lower packing 10 interposed therebetween, a view of the power generating element 3 from the electrolyte solution pouring opening 14 is completely blocked by the first attitude portion (more specifically, the wide portion WA) of the current collector 4, in a space between the electrolyte solution pouring opening 14 and the power generating element 3.

In other words, the first attitude portion FP (more specifically, the wide portion WA) is disposed between the electrolyte solution pouring opening 14 and the power generating element 3, so that the first attitude portion FP (more specifically, the wide portion WA) exists on an arbitrary straight line connecting the opening portion of the electrolyte solution pouring opening 14 and the power generating element 3.

[Manufacturing Process of Secondary Battery RB]

Next, the manufacturing process of the secondary battery RB will be described briefly.

[Battery Assembly Step]

First, a battery assembly step of the secondary battery RB including an assembly step of the current collectors 4 and 6 will be described.

As described above, the power generating element 3 is formed by respectively applying the positive active material and the negative active material on the long band-shaped foil-shaped positive electrode plate and foil-shaped negative electrode plate, winding the plates with the separators sandwiched therebetween after a drying treatment or the like, and pressing the plates into a flat shape. The foil-shaped positive electrode plate and the foil-shaped negative electrode plate have the not-applied portions 3a and 3b which are positioned at one end sides in the width direction and are not applied with the active materials to be connected to the current collectors 4 and 6. The plates are wound such that the not-applied portions 3a and 3b on the positive electrode side and the negative electrode side are positioned at opposite end edge portions from each other, and that the not-applied portions 3a and 3b respectively protrude sideways.

On the other hand, the opening 12 through which the hollow rivet 8 and the like are to be passed, the electrolyte solution pouring opening 14, and the like are formed in the lid portion 2, and the support frames 13 on both of the positive electrode side and the negative electrode side are fixed to the lid portion 2. Because the electrolyte solution plug 16 to be attached to the electrolyte solution pouring opening 14 is fixed after pouring the electrolyte solution, the electrolyte solution pouring opening 14 is open at this point.

As the members to be mounted on the outer side of the case BC, the terminal bolt 5 is placed head down on the bottom portion of the upper packing 11 and the bus bar 9 is fitted into the upper packing 11 while inserting the thread portion of the terminal bolt 5 through the terminal retaining portion 9a. Furthermore, the upper packing 11 is fitted into the support frame 13 fixed to the lid portion 2.

Positioning of the current collector 4 and the lower packing 10, which are members to be mounted on the inner side of the case BC, with respect to each other is carried out as shown in FIG. 7(a), and the upper end of the current collector 4 (the first attitude portion FP) is fitted along the vertical wall portion 10b of the lower packing 10 as shown in FIG. 7(b).

Moreover, while carrying out positioning of portions, through which the hollow rivet 8 is to be passed, in positional relationships shown in FIG. 6, the current collector 4 and the lower packing 10 are brought into contact with a lower face of the lid portion 2 (a face on the inner side of the case BC). With the respective members mounted to the lid portion 2 in this manner, the hollow rivet 8 is inserted in such an attitude that a hollow portion 8a is positioned on the inner side of the case BC, and the hollow rivet 8 is caulked.

In the state in which the current collector 4 is mounted to the lid portion 2 in this manner, the first attitude portion FP (more specifically, the wide portion WA) is disposed to block the view of the power generating element 3 from the electrolyte solution pouring opening 14. Similar operation is carried out on the negative electrode side as well, and the terminal bolt 7 and the current collector 6 are fixed to the lid portion 2 with the upper packing 11, the lower packing 10, and the like interposed therebetween.

After the respective members are mounted to the lid portion 2 on both of the positive electrode side and the negative electrode side, the current collector 4 and the not-applied portion 3a of the foil-shaped positive electrode plate are welded together, and the current collector 6 and the not-applied portion 3b of the foil-shaped negative electrode plate are welded together in positional relationships shown in FIG. 2, to thereby mount the power generating element 3.

The power generating element 3 mounted to the lid portion 2 in this manner is inserted into the can body 1 and the can body 1, and the lid portion 2 are sealed by welding.

[Electrolyte Solution Pouring Step]

Next, the electrolyte solution is poured through the electrolyte solution pouring opening 14 formed in the lid portion 2.

As can be seen from the positional relationships shown in FIG. 6, the lower packing 10 positioned between the lid portion 2 and the current collector 4 has the notch portion 10d directly below the electrolyte solution pouring opening 14, and the electrolyte solution poured through the electrolyte solution pouring opening 14 passes through the position of the lower packing 10 and flows down onto an upper face of the current collector 4.

The electrolyte solution which has flowed down onto the upper face of the current collector 4 flows on the current collector 4 and flows down between the current collector 4 and an inner wall face of the can body 1 along a surface of the current collector 4. Part of the electrolyte solution flowing down along the surface of the current collector 4 passes through the through holes 15 formed in the current collector 4 and flows to a side where the power generating element 3 exists. Therefore, the through holes 15 allow the electrolyte solution poured through the electrolyte solution pouring opening 14 to efficiently reach the power generating element 3.

Considering only efficiency of reaching the space, where the power generating element 3 is disposed, by the electrolyte solution poured through the electrolyte solution pouring opening 14, the through holes 15 are preferably formed in a position directly below the electrolyte solution pouring opening 14 or a position very close to the position. However, considering a sealing step of the electrolyte solution pouring opening 14 (described later), the view of the power generating element 3 from the electrolyte solution pouring opening 14 is blocked by the first attitude portion FP (more specifically, the wide portion WA), and the through holes 15 are displaced from a position of the first attitude portion FP (more specifically, the wide portion WA) of the current collector 4 facing the electrolyte solution pouring opening 14, and formed in an area close to an upper end of the second attitude portion and other than the portion blocking the view of the power generating element 3 from the electrolyte solution pouring opening 14.

After pouring a predetermined amount of electrolyte solution in this manner, a predetermined treatment such as initial charge or the like is carried out appropriately.

[Sealing Step]

Next, the electrolyte solution pouring opening 14 is sealed with the electrolyte solution plug 16 which is a sealing member SE.

Sealing of the electrolyte solution pouring opening 14 with the electrolyte solution plug 16 is carried out by welding. In the present embodiment, welding of the electrolyte solution plug 16 is carried out by laser welding.

Specifically, as shown in FIGS. 4, 8, and the like, positioning of the electrolyte solution plug 16 is carried out by fitting the depressed portion of the electrolyte solution plug 16 into the electrolyte solution pouring opening 14, and a laser beam for welding is applied to an area around an end edge of the electrolyte solution plug 16 as shown with a one-dot chain line LB in FIG. 8 to weld the electrolyte solution plug 16 to the lid portion 2, to thereby seal the electrolyte solution pouring opening 14.

In this sealing step of the electrolyte solution pouring opening 14, the electrolyte solution plug 16 may be displaced from the position where the electrolyte solution pouring opening 14 exists, for example, and spatters generated during the welding or the laser beam itself may enter the case BC through a gap formed between the electrolyte solution plug 16 and the electrolyte solution pouring opening 14.

Even if the spatters generated during the welding or the laser beam itself enters the case BC in this manner, the current collector 4 is positioned directly below the electrolyte solution pouring opening 14, and therefore it is possible to prevent the spatters generated during the welding or the laser beam itself from hitting the power generating element 3.

Furthermore, as shown in FIGS. 7(a), 7(b), and the like, at the portion of the current collector 4 to be mounted to the lid portion 2, the lower packing 10 covers the upper face of the current collector 4 (an upper face of the first attitude portion FP), and the vertical wall portion 10b of the lower packing 10 protrudes to enter gaps between the current collector 4 and vertical wall inner wall faces of the can body 1 (side faces of the case BC substantially orthogonal to the face in which the electrolyte solution pouring opening 14 is formed).

Because the protruding vertical wall portion 10b is disposed to fill the gap, even if metal residues remaining around the electrolyte solution pouring opening 14 drop into the case BC when the electrolyte solution plug 16 is put on the electrolyte solution pouring opening 14, for example, it is possible to suppress falling of the metal residues farther to the position where the power generating element 3 is disposed.

As described above, the manufacturing method of the battery according to the present invention includes: a current collector assembly step of disposing the current collector 4 between the electrolyte solution pouring opening 14 and the power generating element 3 so as to block the view of the power generating element 3 from the electrolyte solution pouring opening 14; an electrolyte solution pouring step of pouring the electrolyte solution through the electrolyte solution pouring opening 14 into the case BC; and a sealing step of disposing the sealing member 16 at the electrolyte solution pouring opening 14 and sealing the electrolyte solution pouring opening 14 by welding, for the battery including the case BC having the electrolyte solution pouring opening 14 through which the electrolyte solution is to be poured into the case, the power generating element 3 housed in the case BC, the electrode terminal 5 disposed on the outer side of the case, and the current collector 4 for electrically connecting the power generating element 3 and the electrode terminal 5.

As a basic structure of the battery, the power generating element 3 and the electrode terminal 5 disposed on the outer side of the battery case BC is required to be electrically connected to each other, and the current collector 4 is provided as a component for the electric connection. Because of the function of the current collector 4, the current collector 4 is routed from a position near the portion of the battery case BC mounted with the electrode terminal 5 to an electric wiring portion of the power generating element 3, and therefore the current collector 4 is disposed in a space in the battery case BC and between the electrode terminal 5 and the power generating element 3 in many cases. Moreover, in order to secure strength as a structural member and to adapt to application of high current, the current collector 4 is formed by a member having certain thickness and width in many cases.

Therefore, in view of these characteristics of disposition, the shape, and the like of the current collector 4, if the electrolyte solution pouring opening 14, the current collector 4, and the power generating element 3 are disposed such that the view of the power generating element 3 from the position of the electrolyte solution pouring opening 14 is blocked by the current collector, even if the spatters drop through the electrolyte solution pouring opening 14 or the laser beam for the welding passes through the electrolyte solution pouring opening 14 when the electrolyte solution pouring opening 14 is sealed by welding, the spatters and the laser beam are intercepted by the current collector 4 and are therefore prevented from reaching the position of the power generating element 3.

Moreover, if the wide portion having the larger width than the opening width of the electrolyte solution pouring opening 14 is formed at the current collector 4 as described above, the wide portion is disposed between the electrolyte solution pouring opening 14 and the power generating element 3 in the current collector assembly step, and the spatters and the laser beam are intercepted more reliably by the wide portion.

The battery according to the present invention includes: the case BC having the electrolyte solution pouring opening 14 through which the electrolyte solution is to be poured into the case; the power generating element 3 housed in the case BC; the electrode terminal 5 disposed on the outer side of the case; and the current collector 4 having at least the first attitude portion FP disposed in an attitude along a face, in which the electrolyte solution pouring opening 14 is formed, to block the view of the power generating element 3 from the electrolyte solution pouring opening 14, the current collector 4 electrically connecting the power generating element 3 and the electrode terminal 5.

Such a current collector 4 is disposed so that the first attitude portion FP in the attitude along the face in which the electrolyte solution pouring opening 14 is formed blocks the view of the power generating element from the electrolyte solution pouring opening 14. Therefore, even if the electrolyte solution pouring opening 14 and the sealing member 16 are displaced from each other when the electrolyte solution pouring opening 14 is sealed by the welding, and the spatters enter through the gap or the laser beam for the welding is applied to the inside through the gap, the spatters and the laser beam are intercepted by the current collector 4, and are therefore prevented from reaching the power generating element 3 and damaging the power generating element 3. This effect can be obtained irrespective of the position of the electrolyte solution pouring opening 14 formed at the case BC. For example, the similar effect can be obtained whether the electrolyte solution pouring opening 14 is formed in the upper face of the case BC or in an upper position of the side face.

As in the above embodiment, preferably, the case BC is substantially formed in the shape of the flat rectangular parallelepiped, the electrolyte solution pouring opening 14 is formed in the face of the case BC mounted with the electrode terminal 5, the current collector 4 includes the first attitude portion FP and the second attitude portion SP that is in the attitude along the side face of the case BC substantially orthogonal to the face in which the electrolyte solution pouring opening 14 is formed, and the first attitude portion FP and the second attitude portion SP are formed by the plate-shaped member bent into the substantially L shape.

Because the first attitude portion FP is disposed to block the view of the power generating element from the electrolyte solution pouring opening 14, even if the spatters drop through the electrolyte solution pouring opening 14 or the laser beam for the welding passes through the electrolyte solution pouring opening 14 when the electrolyte solution pouring opening 14 is sealed by the welding, the spatters and the laser beam are reliably intercepted by the current collector 4.

As in the above embodiment, if the through holes 15 are formed in the position displaced from the position of the current collector facing the electrolyte solution pouring opening 14, even if a flow of the electrolyte solution poured through the electrolyte solution pouring opening 14 is obstructed between the electrolyte solution pouring opening 14 and the power generating element 3, the through holes 15 serve as flow paths for the electrolyte solution to avoid reduction in efficiency in electrolyte solution pouring operation in pouring the electrolyte solution through the electrolyte solution pouring opening 14. Because the through holes 15 are formed in the position displaced from the position facing the electrolyte solution pouring opening 14, the spatters do not reach the power generating element 3 through the through holes 15.

Furthermore, as in the above embodiment, preferably, the insulating sealing member 10 (SB) is provided between the case BC and the current collector 4 when the wiring member passing through the case BC and the current collector 4 are mounted with the case BC interposed therebetween, and the sealing member 10 has the extending portion 10*b* for entering the gap formed between the current collector 4 and the side faces of the case BC substantially orthogonal to the face in which the electrolyte solution pouring opening 14 is formed.

In other words, because the electrode terminal 5 is disposed on the outer side of the case BC, electric wiring between the current collector 4 and the electrode terminal 5 requires the wiring member 8 (WE) passing through the case BC. In order to prevent a leak of the electrolyte solution from a position where the wiring member 8 passes through the case BC and to secure electric insulation between the current collector 4 and the case BC, the current collector 4 is generally fixed to the case BC with the sealing member 10 interposed therebetween. On the other hand, in order to prevent the current collector 4 from coming in contact with the side face of the case BC substantially orthogonal to the face in which the electrolyte solution pouring opening 14 is formed, the gap of a certain size is formed between the side face and the first attitude portion FP of the current collector 4.

Because the gap exists at the position below the electrolyte solution pouring opening 14, the spatters generated during the welding operation may flow from the position of the electrolyte solution pouring opening 14, drop, and enter the case BC to reach the position where the power generating element exists. Moreover, metal impurities existing around the electrolyte solution pouring opening 14 may drop when the lid member 16 is put on the electrolyte solution pouring opening 14, enter the gap, and reach the position in the case BC where the power generating element 3 exists. If the metal impurities reach the position where the power generating element 3 exists, it may cause a short circuit failure. Therefore, in order to minimize the size of the gap, the extending portion for entering the gap is formed at the sealing member.

Other Embodiments

Other embodiments of the present invention will be listed below.

(1) Although the disk-shaped member having the depressed central portion is shown as the example of the electrolyte solution plug 16 for sealing the electrolyte solution pouring opening 14 in the above embodiment, a specific shape of the electrolyte solution plug 16 can be changed appropriately.

For example, an electrolyte solution plug 17 having a shape as shown in FIG. 9 may be used.

The electrolyte solution plug 17 shown in FIG. 9 has such a shape that a protruding portion 17b in a shape of a truncated cone is provided to a disc-shaped base portion 17a and that the protruding portion 17b is fitted into an electrolyte solution pouring opening 14.

To seal the electrolyte solution pouring opening 14 with the electrolyte solution plug 17, the protruding portion 17b of the electrolyte solution plug 17 is fitted into the electrolyte solution pouring opening 14, and in this state, a laser beam is applied to an area around an end edge of the base portion 17a to weld the base portion 17a and a lid portion 2 together.

(2) Although the laser welding is shown as an example of a welding method for sealing the electrolyte solution pouring opening 14 in the above embodiment, other welding techniques such as arc welding may be employed.

(3) Although the terminal bolts 5 and 7 which are the electrode terminals and the current collectors 4 and 6 are electrically connected by the hollow rivets 8 and the bus bars 9, respectively, in the above embodiment, the form of the connection therebetween may be changed appropriately, e.g., rivets such as hollow rivets may be joined to head portions of terminal bolts 5 and 7, and the terminal bolts 5 and 7 and current collectors 4 and 6 may be directly connected, respectively.

(4) Although the first attitude portion FP (more specifically, the wide portion WA) of the current collector 4 is disposed to completely block the view of the power generating element 3 from the electrolyte solution pouring opening 14 in the above embodiment, and this disposition is the most preferable, the view is not necessarily blocked completely, if it is difficult to completely block the view for certain reasons such as avoidance of interference with other parts.

Also in this case, the effect of the present invention can be obtained at a portion where the view of the power generating element 3 from the electrolyte solution pouring opening 14 is blocked.

(5) Although the electrolyte solution pouring opening 14 is formed above the current collector 4 on the positive electrode side in the above embodiment, the electrolyte solution pouring opening 14 may be formed above the current collector 6 on the negative electrode side, i.e., in a position of the lid portion 2 and between a position where the terminal bolt 7 which is the electrode terminal on the negative electrode side is disposed and an end edge in a longitudinal direction of the lid portion 2. To adapt to this, lower packing 10 on the negative electrode side is formed in the same shape as lower packing 10 on the positive electrode side in the above embodiment.

Although the present invention has been described above by taking the battery as an example of the electric storage device, the present invention can be applied to, besides the battery, the electric storage device such as an electric double layer capacitor, and a manufacturing method of the electric storage device, the device including a case having an electrolyte solution pouring opening through which an electrolyte solution is to be poured into the case, an electric storage element housed in the case, electrode terminals disposed on an outer side of the case, and current collectors for electrically connecting the electric storage element and the electrode terminals.

DESCRIPTION OF REFERENCE SIGNS 3 electric storage element (power generating element)
4 current collector
5 electrode terminal
14 electrolyte solution pouring opening
15 through hole
BC case
FP first attitude portion
SB sealing member
SE sealing member
SP second attitude portion
WA wide portion
WE wiring member

The invention claimed is:

1. An electric storage device, comprising:
a case including an electrolyte solution pouring opening through which an electrolyte solution is to be poured into the case;
an electric storage element housed in the case;
an electrode terminal disposed on an outer side of the case; and
a current collector including at least a first attitude portion disposed in an attitude along a face in which the electrolyte solution pouring opening is formed, to block a view of the electric storage element from the electrolyte solution pouring opening, the current collector electrically connecting the electric storage element and the electrode terminal,
wherein the current collector includes a through hole, in a cross sectional view of the electric storage device, the through hole longitudinally extending in a direction orthogonal to the face in which the electrolyte solution pouring opening is formed, for flowing the electrolyte solution to the electric storage element in a direction parallel to the face in which the electrolyte solution pouring opening is formed,
wherein a first portion of the electric storage element is applied with an active material, and
wherein, in a plan view from a top surface of the electric storage device, the electrolyte solution pouring opening is located outside of the first portion of the electric storage element.

2. The electric storage device according to claim 1, wherein the case is substantially formed into a flat rectangular parallelepiped shape, the electrolyte solution pouring opening being formed in a face of the case mounted with the electrode terminal, and
wherein the current collector includes the first attitude portion and a second attitude portion that is in an attitude along a side face of the case substantially orthogonal to the face in which the electrolyte solution pouring opening is formed, the first attitude portion and the second attitude portion being formed by a plate-shaped member bent into a substantially L shape.

3. The electric storage device according to claim 1, wherein the through hole is formed in a position displaced from a position of the current collector facing the electrolyte solution pouring opening.

4. The electric storage device according to claim 1, further comprising an insulating sealing member disposed between the case and the current collector when the current collector and a wiring member passing through the case are mounted with the case interposed therebetween,
wherein the sealing member includes an extending portion for entering a gap formed between the current collector and a side face of the case substantially orthogonal to the face in which the electrolyte solution pouring opening is formed.

5. The electric storage device according to claim 2, wherein the through hole is formed in a position displaced from a position of the current collector facing the electrolyte solution pouring opening.

6. The electric storage device according to claim 2, further comprising an insulating sealing member disposed between the case and the current collector when the current collector and a wiring member passing through the case are mounted with the case interposed therebetween,
wherein the sealing member includes an extending portion for entering a gap formed between the current collector and a side face of the case substantially orthogonal to the face in which the electrolyte solution pouring opening is formed.

7. The electric storage device according to claim 1, wherein the first portion of the electric storage element applied with the active material is opposed to the face in which the electrolyte solution pouring opening is formed.

8. The electric storage device according to claim 7, wherein the electric storage element includes a second portion and a third portion not applied with the active material on both sides of the first portion.

9. The electric storage device according to claim 2, wherein the electrode terminal comprises a positive electrode terminal and a negative electrode terminal that protrude from the outer side of the case and are insulated from the case, and
wherein the current collector comprises a positive current collector and a negative current collector connected to the positive electrode terminal and the negative electrode terminal, respectively.

10. The electric storage device according to claim 9, wherein, in a direction that is parallel to the first attitude portion and is penetrating the second attitude portion, positions where the positive and negative current collectors and the electric storage element are connected are farther away from a center of the electric storage element than positions where the positive and negative electrode terminals are connected to the positive and negative current collectors, respectively.

11. The electric storage device according to claim 1, wherein the electric storage element has a pair of flat outer surfaces and a pair of curved surfaces connecting the flat outer surfaces, and
wherein one of the curved surfaces is opposed to the face in which the electrolyte solution pouring opening is formed.

12. The electric storage device according to claim 8, wherein at least one of the second portion and the third portion of the electric storage element is opposed to the electrolyte solution pouring opening.

13. The electric storage device according to claim 1, wherein the current collector further includes a second attitude portion that is in an attitude along a side face of the case substantially orthogonal to the face in which the electrolyte solution pouring opening is formed, in the cross sectional view of the electric storage device, the through hole longitudinally extending in the second attitude portion.

14. The electric storage device according to claim 13, wherein the current collector further includes a connection portion protruding from the second attitude portion toward the electric storage element, the connection portion connecting the current collector to the electric storage element.

15. The electric storage device according to claim 14, wherein, in the plan view, the through hole is located inside the connection portion.

16. An electric storage device, comprising:
a case including an electrolyte solution pouring opening through which an electrolyte solution is to be poured into the case;
an electric storage element housed in the case;
an electrode terminal disposed on an outer side of the case; and
a current collector including an attitude portion disposed in an attitude along a face in which the electrolyte solution pouring opening is formed, to block a view of the electric storage element from the electrolyte solution pouring opening, the current collector electrically connecting the electric storage element and the electrode terminal,
wherein a portion of the electric storage element is applied with an active material, and
wherein, in a plan view from a top surface of the electric storage device, the electrolyte solution pouring opening is located outside of the portion of the electric storage element.

* * * * *